US009575796B2

(12) United States Patent
Tsirkin (10) Patent No.: US 9,575,796 B2
(45) Date of Patent: Feb. 21, 2017

(54) VIRTUAL DEVICE TIMEOUT BY MEMORY OFFLINING

(71) Applicant: Red Hat Israel, Ltd., Ra'anana (IL)

(72) Inventor: Michael Tsirkin, Yokneam Illit (IL)

(73) Assignee: Red Hat Isreal, Ltd., Ra'anana (IL)

( * ) Notice: Subject to any disclaimer, the term of this patent is extended or adjusted under 35 U.S.C. 154(b) by 0 days.

(21) Appl. No.: 14/623,071

(22) Filed: Feb. 16, 2015

(65) Prior Publication Data

US 2016/0239325 A1   Aug. 18, 2016

(51) Int. Cl.
G06F 9/54   (2006.01)
G06F 9/455   (2006.01)
G06F 9/50   (2006.01)

(52) U.S. Cl.
CPC ......... G06F 9/45558 (2013.01); G06F 9/5016 (2013.01); G06F 2009/45579 (2013.01); G06F 2009/45583 (2013.01)

(58) Field of Classification Search
CPC ............... G06F 9/45558; G06F 9/5016; G06F 2009/45583; G06F 2009/45579
See application file for complete search history.

(56) References Cited

U.S. PATENT DOCUMENTS

| 7,526,577 | B2 | 4/2009 | Pinkerton et al. |
| 7,529,784 | B2 | 5/2009 | Kavuri et al. |
| 7,783,880 | B2 | 8/2010 | Pinkerton et al. |
| 8,250,586 | B2 | 8/2012 | Nelson |
| 8,701,126 | B2 | 4/2014 | van Riel |
| 8,719,470 | B2 | 5/2014 | Bond et al. |
| 2009/0106754 | A1 | 4/2009 | Liu et al. |
| 2009/0307447 | A1* | 12/2009 | Jacobs ................ G06F 11/0712 711/162 |
| 2010/0162238 | A1* | 6/2010 | Warfield ............. G06F 9/45533 718/1 |

(Continued)

FOREIGN PATENT DOCUMENTS

CN    102262557    11/2011

OTHER PUBLICATIONS

ZIVM: A Zero-Copy Inter-VM Communication Mechanism for Cloud Computing; Hamid Reza Mohebbi; School of Computer Engineering, Iran University of Science and Technology; Published Nov. 1, 2011; ISSN 1913-8989; E-ISSN 1913-8997.

(Continued)

*Primary Examiner* — Charles E Anya
*Assistant Examiner* — Abdou Seye
(74) *Attorney, Agent, or Firm* — K&L Gates LLP (57) ABSTRACT

A system, methods, and apparatus for virtual device timeout by memory offlining. A hypervisor receives a message from a source virtual machine to be transmitted to a destination machine and reserves a block of memory associated with the message. The message received from the source virtual machine is transmitted to the destination machine. The hypervisor then determines whether to reclaim the block of memory. If reclaiming the block of memory, the hypervisor offlines the block of memory by offlining one or more pages corresponding to the block of memory and/or offlining all memory corresponding to the source virtual machine. The hypervisor then indicates to the source virtual machine that the block of memory is accessible.

20 Claims, 6 Drawing Sheets

(56) References Cited

U.S. PATENT DOCUMENTS

| | | | |
|---|---|---|---|
| 2011/0145539 A1* | 6/2011 | Schmidt | G06F 9/5016 711/171 |
| 2014/0149634 A1* | 5/2014 | Tosatti | G06F 9/45558 711/6 |
| 2014/0173599 A1* | 6/2014 | Konik | G06F 9/4881 718/1 |

OTHER PUBLICATIONS

Xen and the Art of Virtualization; Paul Barham et al.; University of Cambridge; Published Oct. 19-22, 2003.
Device driver reuse via virtual machines; Joshua Thomas LeVasseur; School of Computer Science and Engineering of the University of New South Wales; May 2009.
Flexible virtual machines in distributed systems and grids; Dohan Kim; School of Computer Science, University of Windsor.
Message Passing for Gigabit/s Networks with "Zero-Copy" under Linux; Irina Chihaia; Technical University of Cluj-Napoca 1999.

* cited by examiner

FIG. 1

Extended Page Table 182

| 240A<br>x0001 | 250A<br>Read-Only | 260A<br>x01AF |
|---|---|---|
| 240B<br>x0002 | 250B<br>Inaccessible | 260B   Message Data<br>x01FF |
| 240C<br>x0003 | 250C<br>Read-Write | 260C<br>x024F |
| 240D<br>x0004 | 250D<br>Read-Write | 260D   Copy of Message Data<br>x029F |
| 240E<br>x0005 | 250E<br>Executable Only | 260E<br>x02EF |
| 240F<br>x0006 | 250F<br>Executable | 260F<br>x033F |

VIRTUAL DEVICE TIMEOUT BY MEMORY OFFLINING

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as hypervisor, above the hardware and below the virtual machines. A hypervisor may run directly on the server hardware without an operating system beneath it or as an application running under a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system, methods and apparatus for virtual device timeout by memory offlining.

In an example embodiment, a system includes memory, one or more physical processors, one or more virtual machines executing on the one or more physical processors, and a hypervisor executing on the one or more physical processors. The hypervisor receives a message from a source virtual machine to be transmitted to a destination machine and reserves a block of memory associated with the message. The message is transmitted from the source virtual machine to the destination machine. The hypervisor then determines whether to reclaim the block of memory. If reclaiming the block of memory, the hypervisor offlines the block of memory by offlining one or more pages corresponding to the block of memory and/or offlining all memory corresponding to the source virtual machine. The hypervisor then indicates to the source virtual machine that the block of memory is accessible.

Additional features and advantages of the disclosed method and apparatus are described in, and will be apparent from, the following Detailed Description and the Figures.

DETAILED DESCRIPTION OF EXAMPLE EMBODIMENTS

Figure 1:
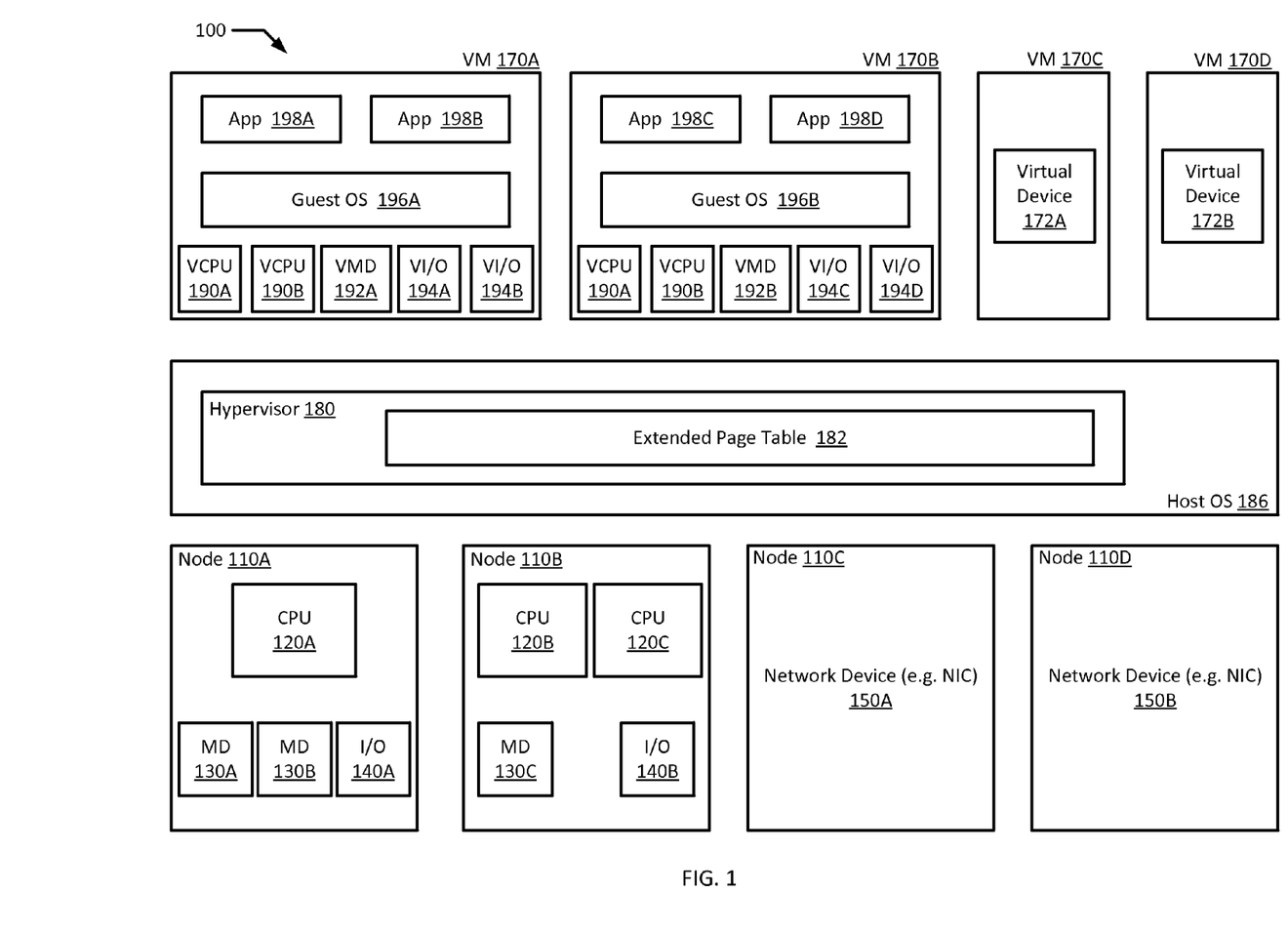
FIG. 1 is a block diagram of an example multiprocessor computer system according to an example embodiment of the present disclosure.

FIG. 1 depicts a high-level component diagram of an example multi-processor (or host) computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a networking device 150A-B. In an example embodiment, a network device (e.g., 150A-B) may be a network interface controller (NIC), a network adapter, or any other component that connects a computer to a computer network.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI).

Computer system 100 may run multiple virtual machines (e.g., VM 170A-D), by executing a software layer (e.g., hypervisor 180) above the hardware and below the virtual machines 170A-D, as schematically shown in FIG. 1. In an example embodiment, the hypervisor 180 may be a component of the host operating system 186 executed by the computer system 100. In another example embodiment, the hypervisor 180 may be provided by an application running under the operating system 186, or may run directly on the host computer system 100 without an operating system beneath it. The hypervisor 180 may virtualize the physical layer, including processors, memory, and I/O devices, and present this virtualization to virtual machines 170A-D as virtual devices, including virtual processors (e.g., VCPU 190A-D), virtual memory (e.g., VMD 192-B), and/or virtual I/O devices (e.g., VI/O 194A-D).

In an example embodiment, A virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. In an example embodiment, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D.

In another example embodiment, a virtual machine 170C-D may include virtual devices 172A-B. A virtual device 172A-B may provide the functionality of traditional hardware devices such as network devices, storage devices, sound or video adaptors, photo/video cameras, printer devices, keyboards, displays, etc.

The hypervisor may also include one or more extended page tables 182. Exemplary embodiments of these data structures are described in greater detail below and as shown in FIG. 2.

Figure 2:
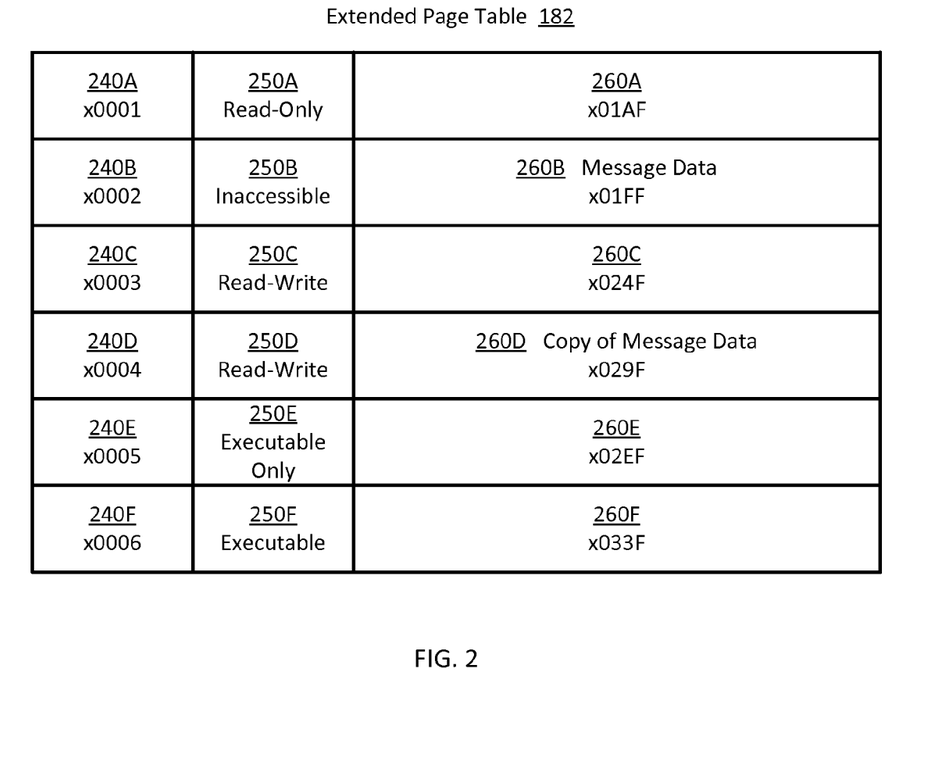
FIG. 2 is a block diagram of an example extended page table according to an example embodiment of the present disclosure.
Figure 3:
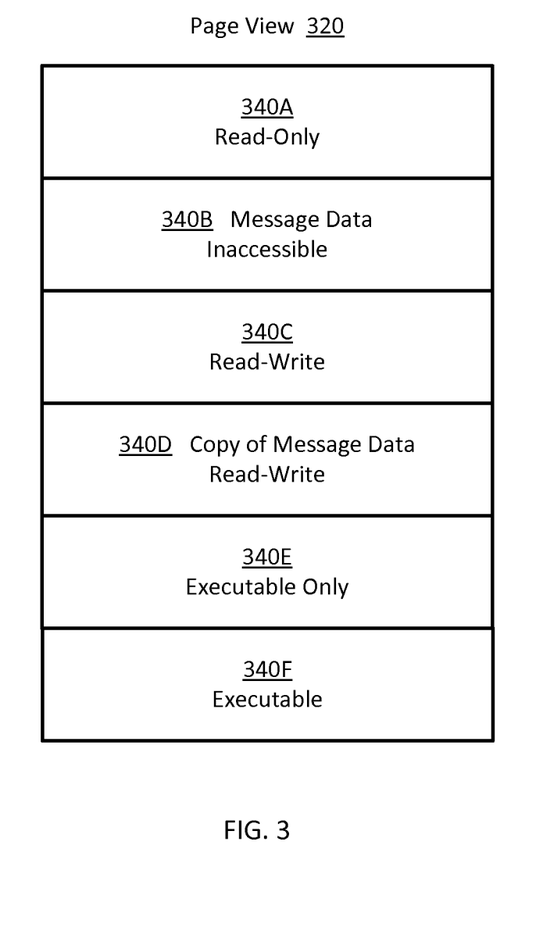
FIG. 3 a block diagram of an example page view according to an example embodiment of the present disclosure.

FIG. 2 illustrates an extended page table (otherwise referred to as a page table) 182 according to an example embodiment of the present disclosure. In general, the hypervisor 180 manages the memory usage of the VMs 170A-D. Both virtual memory and physical memory may be divided into pages which are identified with a unique number (e.g., Page Frame Number (PFN) 310A-E or 340A-F). Example embodiments of pages and page views are described in greater detail below and as shown in FIG. 3.

A page table 182 is a data structure used by the hypervisor 180 to store a mapping of physical addresses for the VM 170A-D to physical addresses for the host (e.g., used by the host hardware platform 100). Accordingly, address translation from VM-physical to host-physical memory addresses is handled using page tables. For example, each process or application operating within the VMs 170A-D may be given the impression that there is a contiguous section of memory available, when in reality, the available memory may be spread across various memory devices 130A-C.

The extended page table 182 comprises entries that map a virtual PFN 240A-F with a physical address 260A-F. Page tables 182 may be used together with any paging data structure used by the VMs 170A-D to support translation from virtual to physical addresses (e.g., 32-bit linear address space using a two-level hierarchical paging structure, Physical Address Extension mode, INTEL Extended Memory 64 Technology mode, etc.).

In an example embodiment, page tables 182 may also include a protection identifier 250A-F. The protection identifier 250A-F indicates the access protection status of a page for the page view described by the page table. A protection status may used to define for example that a given page is writable (or read-write), write-protected (or read-only), executable (or executable and readable), executable only, inaccessible (or non-present), etc. For example, in FIG. 2, the page associated with virtual PFN x0001 and memory location x01AF has been defined in page table 182 as 'Read-Only'. The hypervisor 180 may be used to control to protection status of pages. In addition, in an example embodiment, the page table 182 may include additional information not shown in FIG. 2 including statistics information, background information, dirty identifiers which indicate that modifications to a page must be written back to disk, etc.

In an example embodiment, one or more page tables 182 may be maintained by the hypervisor 180 for each of the VMs 170A-D which maps virtual addresses to physical addresses that are accessible by each of the VMs 170. The sizes of different page tables may vary and may include more entries than are illustrated in FIG. 2.

FIG. 3 illustrates page view 320 and pages 340A-F in accordance with an example embodiment of the present disclosure. As noted above, a page 340A-F may be a portion of physical or virtual memory designated for storing data. As used herein, a page view 320 denotes a mapping from VM-physical addresses to host-physical addresses. For example, page view 320 is referenced by a page table 182. In an example embodiment, the page view 320 may denote the mapping from virtual PFNs of a VM 170A-D to host-physical addresses, as used during normal execution of the VM 170A-D. In another example embodiment, the page view 320 may denote a mapping of addresses designated for use by the hypervisor 180 to host-physical addresses. As illustrated in FIG. 3, pages (e.g., 340A) may be defined by access protections (described above in more detail) such as 'Read-Only' in accordance with their respective page table 182 protection identifiers (e.g., 250A).

Figure 4:
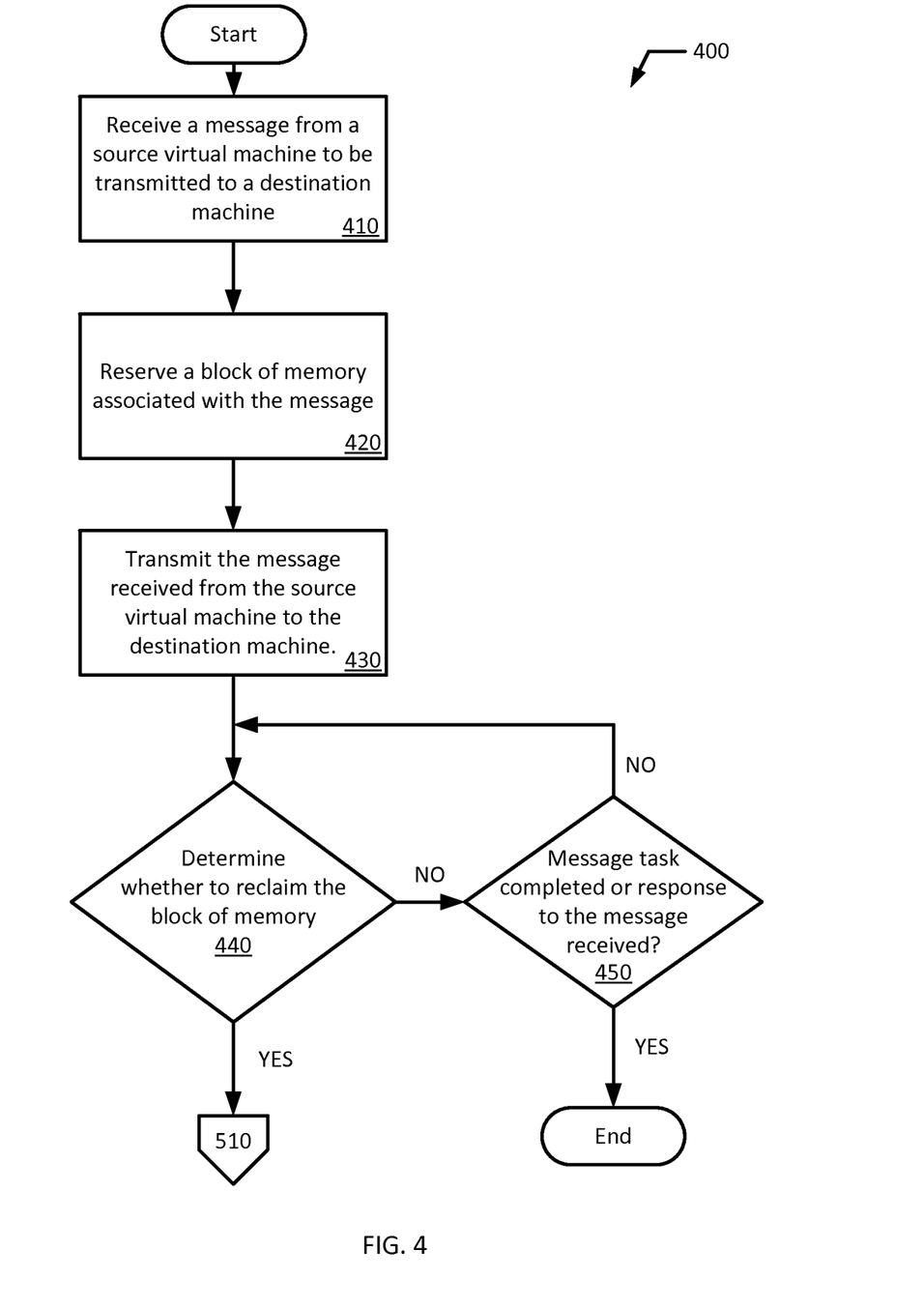
FIG. 4 is a flowchart illustrating an example process for virtual device timeout by memory offlining according to an example embodiment of the present disclosure.
Figure 5:
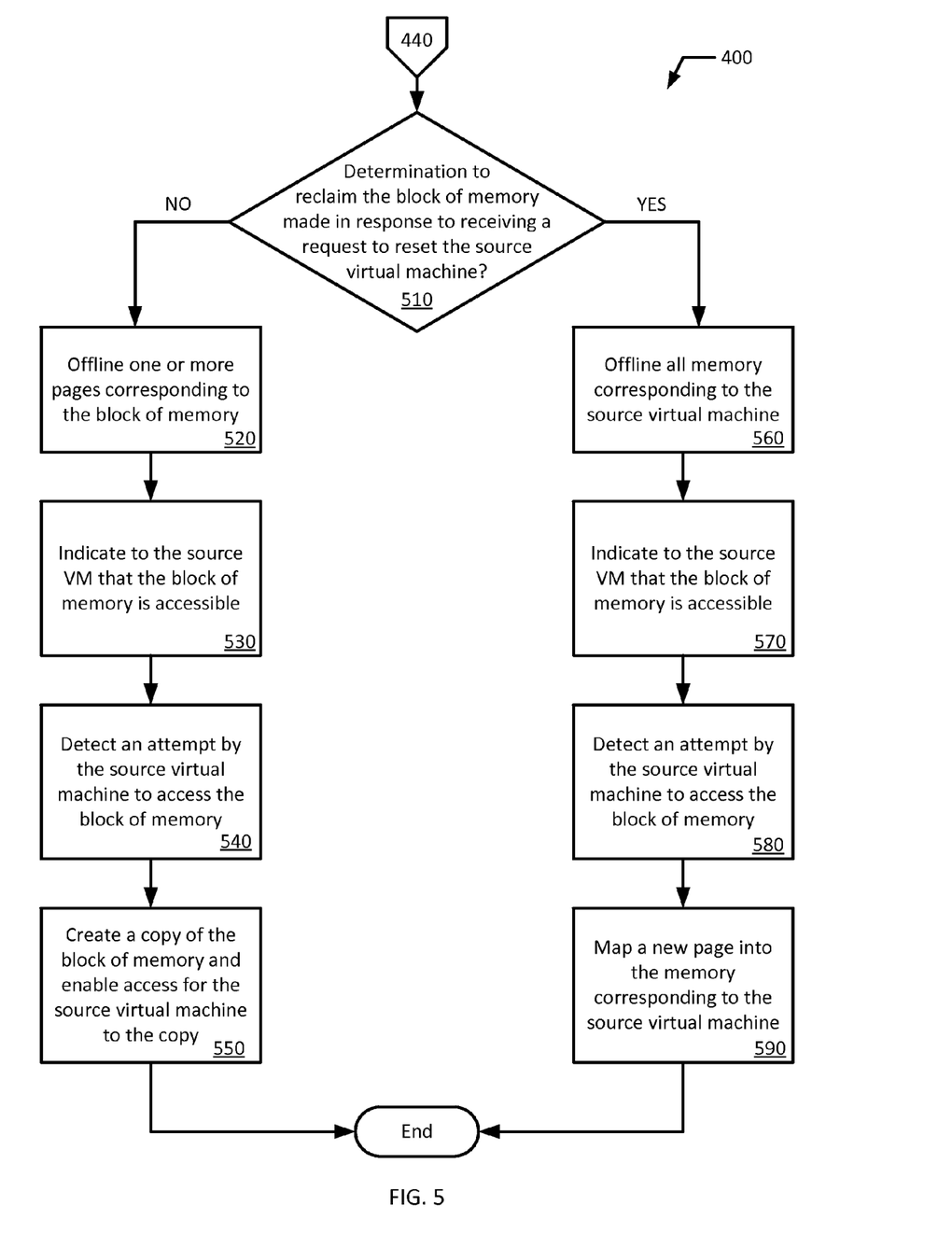
FIG. 5 is a flowchart continuing the example process illustrated in FIG. 4.

FIGS. 4 and 5 illustrates a flowchart of an example method 400 for virtual device timeout by memory offlining. Although the example method 400 is described with reference to the flowchart illustrated in FIGS. 4 and 5, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software (such as is run on a general purpose computer system or a dedicated machine), or a combination of both. In an example embodiment, the method is performed by a hypervisor 180.

The example method 400 starts and the hypervisor 180 receives a message from a source virtual machine to be transmitted to a destination machine (block 410). In an example embodiment, the message from the source virtual machine may be a request to the destination machine to complete a task. In an example embodiment, a source virtual machine may be a VM 170A-D managed by hypervisor 180. In an example embodiment, a destination machine may be a VM 170A-D managed by hypervisor 180. In another example embodiment, a destination machine may be a virtual machine similar to VM 170A-D that is not managed by hypervisor 180 and that is external to system 100 (not shown). In yet another example embodiment, a destination machine may be a traditional hardware device (such as a network device, storage device, sound or video adaptor, photo/video camera, printer device, keyboard, display, etc.) that is managed by system 100. In yet another example embodiment, a destination machine may be a traditional hardware device (such as a network device, storage device, sound or video adaptor, photo/video camera, printer device, keyboard, display, etc.) that is external to system 100.

The hypervisor 180 reserves a block of memory associated with the message (block 420). The hypervisor 180 then transmits the message received from the source virtual machine (e.g., VM 170B) to the destination machine (e.g., VM 170C) (block 430). In an example embodiment, a block of memory may be virtual memory or physical memory. In an example embodiment, a block of memory may be of a variety of different sizes. In an example embodiment, a block of memory may refer to multiple segments of that may be contiguous or may be dispersed across different areas of physical memory.

In an example embodiment, blocks 420 and 430 incorporate zero copy sending and receiving operations which reduce the overhead associated with multiple context switching and multiple copying of data. Reserving, by the hypervisor 180, a block of memory associated with the message may include writing message data to a block of memory (e.g., a portion of a buffer) that is managed by the hypervisor 180. For example, the hypervisor 180 may write message data to a page 340B (illustrated in FIG. 3) corresponding to a PFN 240B and address 260B of extended page table 182 (illustrated in FIG. 2). In another example embodiment, reserving a block of memory may further include pinning the block of memory. In yet another example embodiment, the hypervisor 180 may reserve the block of memory by designating a pointer to the block of memory.

The hypervisor 180 determines whether to reclaim the block of memory (e.g., page 340B) (block 440). In an example embodiment, the hypervisor 180 makes the determination as to whether to reclaim the block of memory (e.g., page 340B) by evaluating whether an amount of time that has elapsed since the message was transmitted to the destination machine without either receiving a response or completing the message task exceeds a maximum time out value. If this amount of time exceeds the maximum time out value, the hypervisor 180 makes the determination to reclaim the block of memory (e.g., page 340B). In an example embodiment, the maximum time out value is provided to the hypervisor 180 by the source virtual machine (e.g., VM 170B). This advantageously allows the source virtual machine (e.g., VM 170B) to determine when a message time out should occur.

In another example embodiment, the hypervisor 180 makes the determination to reclaim the block of memory (e.g., page 340B) upon receiving a request from the source virtual machine (e.g., VM 170B) to reclaim the block of memory (e.g., page 340B). The hypervisor 180 may make the determination to reclaim the block of memory (e.g., page 340B) upon receiving a request to reclaim the block of memory (e.g., page 340B) from a module other than the source virtual machine (e.g., VM 170B). For example, this request may be transmitted from the host system 100.

In an example embodiment, the request from the source virtual machine (e.g., VM 170B) is transmitted upon determining that an amount of time that has elapsed since the message was transmitted to the destination machine (e.g., VM 170C) without either receiving a response or completing the message task exceeds a maximum time out value.

In another example embodiment, the request from the source virtual machine (e.g., VM 170B) is transmitted upon determining that there is a shortage of unallocated memory accessible to the source virtual machine (e.g., VM 170B). In accordance with this, if the source virtual machine (e.g., VM 170B) determines that it is out of memory, it may make a request to the hypervisor 180 to reclaim the block of memory (e.g., page 340B) associated with the message transmitted to the destination machine (e.g., VM 170C). In another example embodiment, the request from the source virtual machine (e.g., VM 170B) may simply be an indication that there is a shortage of unallocated memory accessible to the source virtual machine (e.g., VM 170B).

In another example embodiment, the request from the source virtual machine (e.g., VM 170B) is a request to disable access to the block of memory (e.g., page 340B). For example, this may be a request to unmap the block of memory (e.g., page 340B) from the source virtual machine (e.g., VM 170B) or a request to modify the access protection status of the block of memory (e.g., page 340B).

In another example embodiment, the request from the source virtual machine (e.g., VM 170B) is a request to reset the source virtual machine (e.g., VM 170B). In yet another example embodiment, if source virtual machine 170D has a virtual device (e.g., 172B), the request may be a request to reset the virtual device (e.g., 172B) itself or a request to reset a virtual machine (e.g., 170D) that manages the virtual device (e.g., 172B).

If the hypervisor 180 determines that, no, it will not reclaim the block of memory (e.g., page 340B), the hypervisor 180 determines whether a response to the message transmitted to the destination machine (e.g., VM 170C) has been received, or a task requested by the message has been completed (block 450). If the hypervisor 180 determines that a response has been received or the message task has been completed, example method 400 ends. If not, the hypervisor 180 continues to determine whether to reclaim the block of memory (e.g., page 340B) as described with reference to block 440.

If the hypervisor 180 determines that, yes, it will reclaim the block of memory (e.g., page 340B), the example method 400 continues to block 510 as illustrated in FIG. 5 and described below.

The hypervisor 180 then offlines the block of memory (e.g., page 340B) as described in more detail below with reference to blocks 520 and 560. In an example embodiment, offlining memory (e.g., pages 340A-F) includes unmapping the memory (e.g., pages 340A-F) from the source virtual machine (e.g., VM 170B). In another example embodiment, offlining memory (e.g., pages 340A-F) includes modifying an access protection status of one or more page entries (e.g., corresponding to PFN 240A-F) of a page table 182 corresponding to the memory (e.g., pages 340A-F). For example, one or more protection identifiers 250A-F of page table 182 corresponding to the memory (e.g., pages 340A-F) may be modified to render the memory (e.g., pages 340A-F) read-only. Alternatively, one or more protection identifiers 250A-F of page table 182 corresponding to the memory (e.g., pages 340A-F) may be modified to render the memory (e.g., pages 340A-F) inaccessible.

If the determination to reclaim the block of memory (page 340B) was made in response to receiving a request to reset the source virtual machine (e.g., VM 170B) (block 510), the hypervisor 180 offlines all memory corresponding to the source virtual machine (e.g., VM 170B) (block 560). The hypervisor may 180 then indicate to the source virtual machine (e.g., VM 170B) that the block of memory (e.g., page 340B) is accessible (block 570). In an example embodiment, the hypervisor 180 is not required to provide any indication to the source virtual machine (e.g., VM 170B) that the block of memory (e.g., page 340B) is accessible. In another example embodiment, the hypervisor 180 may provide such an indication to the source virtual machine (e.g., VM 170B) after the hypervisor makes the block of memory (e.g., page 340B) accessible to the source virtual machine (e.g., VM 170B) (e.g., by mapping a new page as described below in reference to block 590). The hypervisor 180 may then detect an attempt by the source virtual machine (e.g., VM 170B) to access the block of memory (e.g., page 340B) (block 580). For example, the hypervisor 180 may detect an attempt by the source virtual machine (e.g., VM 170B) to write to the block of memory (e.g., page 340B). If the hypervisor 180 detects such an attempt by the source virtual machine (e.g., VM 170B), the hypervisor 180 maps a new page (e.g., page 340A-F) into the memory corresponding to the source virtual machine (e.g., VM 170B) (block 590). In an example embodiment, the new page is a zero page. In an example embodiment, the hypervisor 180 may detect an attempt to access the block of memory (e.g., page 340B) and map a new page (e.g., page 340A-F) to the memory corresponding to the source virtual machine (e.g., VM 170B) using one or more page fault handlers. For example, a first page fault handler may be invoked when an attempt is made to access the block of memory (e.g., page 340B). The first page fault handler may map the new page (e.g., page 340A-F) into the memory corresponding to the source virtual machine (e.g., VM 170B) and a second page fault handler may cause any access to the block of memory (e.g., page 340B) to be redirected to the new page (e.g., page 340A-F).

If the determination to reclaim the block of memory (page 340B) was not made in response to receiving a request to reset the source virtual machine (e.g., VM 170B) (block 510), the hypervisor 180 offlines one or more pages (e.g., page 340B) corresponding to the block of memory (block 520). In an example embodiment, the hypervisor 180 may unmap the memory page (e.g., page 340B) from the source virtual machine (e.g., VM 170B). In another example embodiment, the hypervisor 180 may render the memory page (e.g., page 340B) read-only or inaccessible. The hypervisor may 180 then indicate to the source virtual machine (e.g., VM 170B) that the block of memory (e.g., page 340B) is accessible (block 530). In an example embodiment, the hypervisor 180 is not required to provide any indication to the source virtual machine (e.g., VM 170B) that the block of memory (e.g., page 340B) is accessible. In another example embodiment, the hypervisor 180 may provide such an indication to the source virtual machine (e.g., VM 170B) after the hypervisor makes the block of memory (e.g., page 340B) accessible to the source virtual machine (e.g., VM 170B) (e.g., by creating a copy of the block of memory as described below in reference to block 550). The hypervisor 180 may then detect an attempt by the source virtual machine (e.g., VM 170B) to access the block of memory (e.g., page 340B) (block 540). For example, the hypervisor 180 may detect an attempt by the source virtual machine (e.g., VM 170B) to write to the block of memory (e.g., page 340B). If the hypervisor 180 detects such an attempt by the source virtual machine (e.g., VM 170B), the hypervisor 180 creates a copy of the block of memory (e.g., page 340B) and enables access for the source virtual machine (e.g., VM 170B) to the copy (e.g., page 340D) (block 550). For example, if any process attempts to modify the offlined block of memory (e.g., page 340B which has been made inaccessible by the hypervisor 180), the hypervisor 180 may create a copy of that page to a new location in the memory. For example, as illustrated in FIGS. 2 and 3, the hypervisor 180, may copy the message data in page 340B into page 340D and modify a page entry (e.g., corresponding to PFN 240D, protection identifier 250D, and address 260D) of a page table 182 accordingly. In an example embodiment, the protection identifier 250D corresponding to the copy 340D of the block of memory (e.g., page 340B) is set to read-write. In an example embodiment, the hypervisor 180 may detect an attempt to access the block of memory (e.g., page 340B) and create a copy of the block of memory (e.g., page 340B) and enable access for the source virtual machine (e.g., VM 170B) to the copy 340D using one or more page fault handlers. For example, a first page fault handler may be invoked when an attempt is made to access the block of memory (e.g., page 340B). The first page fault handler may create a copy of the block of memory (e.g., page 340B) and enable access for the source virtual machine (e.g., VM 170B) to the copy 340D and a second page fault handler may cause any access to the block of memory (e.g., page 340B) to be redirected to the copy 340D.

Offlining memory as described in the present disclosure reduces overhead and CPU utilization particularly where there is an indefinite delay by a destination machine (e.g., VM 170C) in processing a received messsage. Such a delay may also cause a source virtual machine (e.g., VM 170B) to crash or prevent reboot of the source virtual machine (e.g., VM 170B). The present disclosure advantageously protects system 100 from the above described problems.

Figure 6:
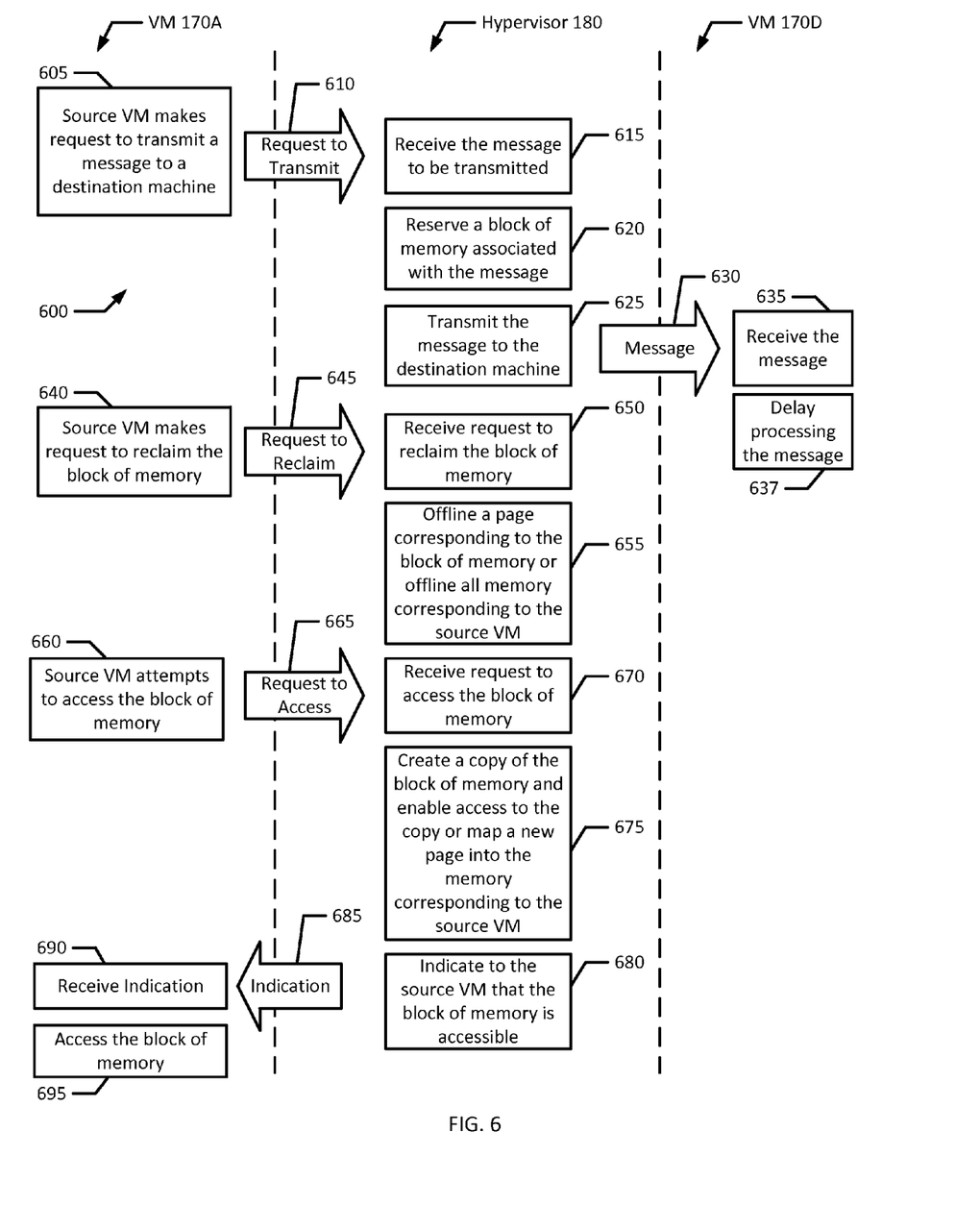
FIG. 6 is a flow diagram illustrating a source virtual machine, a hypervisor, and a destination machine according to an example embodiment of the present disclosure.

FIG. 6 illustrates a flow diagram of an example process 600 including a source virtual machine (e.g., VM 170A), a hypervisor 180, and a destination machine (e.g., VM 170D) in accordance with an example embodiment of the present disclosure. In the illustrated example embodiment, the source virtual machine (e.g., VM 170A) makes a request to the hypervisor 180 transmit a message to a destination machine (e.g., 170D) (block 605). The source virtual machine (e.g., VM 170A) transmits the request to the hypervisor 180 (block 610). The hypervisor 180 receives the request and message data to be transmitted to the destination machine (block 615). The hypervisor 180 reserves a block of memory (e.g., page 340B) associated with the message (block 620). The hypervisor 180 transmits the message to the destination machine (e.g., VM 170D) (blocks 625 and 630). The destination machine (e.g., VM 170D) receives the message (block 635). Then, there may be a delay processing the message by the destination machine (e.g., VM 170D) (block 637). In an example embodiment, the destination machine (e.g., VM 170D) may not have received the message. In another example embodiment, the delay processing the message may be due to an error or may be due to the destination machine (e.g., VM 170D) prioritizing other tasks over the message from the source virtual machine (e.g., VM 170A).

The source virtual machine (e.g., VM 170A) then makes a request to reclaim the block of memory (e.g., page 340B) (block 640). Example embodiments of a request to reclaim the block of memory are described above in greater detail with reference to block 440 of FIG. 4. The request to reclaim the block of memory (e.g., page 340B) is transmitted to the hypervisor 180 (block 645).

The hypervisor 180 receives the request to reclaim the block of memory (e.g., page 340B) and determines to reclaim the block of memory (e.g., page 340B) (block 650). In another embodiment, the source virtual machine (e.g., VM 170A) may not make a request to reclaim the block of memory (e.g., page 340B) and the hypervisor may independently determine to reclaim the block of memory (e.g., page 340B). Example embodiments of determining whether to reclaim a block of memory (e.g., page 340B) are described above in greater detail with reference to block 440 of FIG. 4.

In another example embodiment, before the source virtual machine (e.g., VM 170A) transmits a request to reclaim the block of memory and/or before the hypervisor determines to reclaim the block of memory (e.g., page 340B), hypervisor 180 may determine that a response has been received from the destination machine (e.g., 170D) or that the message task has been completed by the destination machine (e.g., 170D). As such, the hypervisor 180 may not offline the block of memory in accordance with the present disclosure.

Continuing from block 650, the hypervisor 180 may then offline one or more pages corresponding to the block of memory (e.g., page 340B) or offline all memory corresponding to the source virtual machine (e.g., VM 170A). The source virtual machine (e.g., VM 170A) may then attempt to access the block of memory (e.g., page 340B) (block 660). In an example embodiment, this may be a request transmitted to the hypervisor 180 to access the block of memory (e.g., page 340B) (block 665). In another example embodiment, the source virtual machine (e.g., VM 170A) may attempt to access the block of memory (e.g., page 340B) without transmitting a request to the hypervisor 180 and the hypervisor may detect the attempt to access the block of memory (e.g., page 340B) using one or more page fault handlers.

The hypervisor 180 may then receive the request to access the block of memory (e.g., page 340B) (block 670). The hypervisor 180 either creates a copy (e.g., page 340D) of the block of memory (e.g., page 340B) and enables access for the source virtual machine (e.g., VM 170A) to the copy (e.g., page 340D) or maps a new page (e.g., page 340A-F) into the memory corresponding to the source virtual machine (e.g., VM 170A) (block 675). The hypervisor 180 then indicates to the source virtual machine (e.g., VM 170A) that the block of memory (e.g., page 340B) is accessible (block 680). This indication may be transmitted to the source virtual machine (e.g., VM 170A). The source virtual machine (e.g., VM 170A) may then receive the indication (block 690). The source virtual machine (e.g., VM 170A) may then access the block of memory (e.g., page 340B) (block 695). In an example embodiment, when the source virtual machine attempts to access the block of memory, a page fault handler may be used cause any access to the block of memory (e.g., page 340B) to be redirected to either the new page (e.g., page 340A-F) or to the copy 340D (e.g., page 340D).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system comprises a memory, one or more processors in communication with the memory, one or more virtual machines executing on the one or more processors, and a hypervisor executing on the one or more processors to receive, by the hypervisor, a message from a source virtual machine to be transmitted to a destination machine, reserve, by the hypervisor, a block of memory associated with the message, transmit the message received from the source virtual machine to the destination machine, determine, by the hypervisor, whether to reclaim the block of memory, responsive to a determination to reclaim the block of memory, offline, by the hypervisor, the block of memory by at least one of offlining one or more pages corresponding to the block of memory and offlining all memory corresponding to the source virtual machine, and indicate, by the hypervisor, to the source virtual machine that the block of memory is accessible. In accordance with another example aspect of the present disclosure, which may be used in combination with the first aspect, reserving the block of memory includes pinning the block of memory. In accordance with another example aspect of the present disclosure, which may be used in combination with any one or more of the preceding aspects, the determination to reclaim the block of memory occurs upon determining, by the hypervisor, that an amount of time exceeds a maximum time out value, wherein the amount of time is the time that has elapsed since the message was transmitted to the destination machine without at least one of receiving a response and completing a task. In accordance with another example aspect of the present disclosure, which may be used in combination with any one or more of the preceding aspects, the maximum time out value is provided to the hypervisor by the source virtual machine. In accordance with another example aspect of the present disclosure, which may be used in combination with any one or more of the preceding aspects, the determination, by the hypervisor, to reclaim the block of memory occurs upon receiving a request from the source virtual machine to reclaim the block of memory. In accordance with another example aspect of the present disclosure, which may be used in combination with any one or more of the preceding aspects, the request from the source virtual machine is transmitted upon determining that an amount of time exceeds a maximum time out value, wherein the amount of time is the time that has elapsed since the message was transmitted to the destination machine without at least one of receiving a response and completing a task. In accordance with another example aspect of the present disclosure, which may be used in combination with any one or more of the preceding aspects, the request from the source virtual machine is a request to disable access to the block of memory. In accordance with another example aspect of the present disclosure, which may be used in combination with any one or more of the preceding aspects, the request from the source virtual machine is a request to reset the source virtual machine.

In a second example aspect of the present disclosure, a method comprises receiving, by a hypervisor executing on a computer system, a message from a source virtual machine to be transmitted to a destination machine, reserving, by the hypervisor, a block of memory associated with the message, transmitting the message received from the source virtual machine to the destination machine, determining, by the hypervisor, whether to reclaim the block of memory, responsive to a determination to reclaim the block of memory, offlining, by the hypervisor, the block of memory by at least one of offlining one or more pages corresponding to the block of memory and offlining all memory corresponding to the source virtual machine, and indicating, by the hypervisor, to the source virtual machine that the block of memory is accessible. In accordance with another example aspect of the present disclosure, which may be used in combination with the any one or more of the preceding aspects, reserving the block of memory includes pinning the block of memory. In accordance with another example aspect of the present disclosure, which may be used in combination with any one or more of the preceding aspects, the determination to reclaim the block of memory occurs upon determining, by the hypervisor, that an amount of time exceeds a maximum time out value, wherein the amount of time is the time that has elapsed since the message was transmitted to the destination machine without at least one of receiving a response and completing a task. In accordance with another example aspect of the present disclosure, which may be used in combination with any one or more of the preceding aspects, the maximum time out value is provided to the hypervisor by the source virtual machine. In accordance with another example aspect of the present disclosure, which may be used in combination with any one or more of the preceding aspects, the determination, by the hypervisor, to reclaim the block of memory occurs upon receiving a request from the source virtual machine to reclaim the block of memory. In accordance with another example aspect of the present disclosure, which may be used in combination with any one or more of the preceding aspects, the request from the source virtual machine is transmitted upon determining that an amount of time exceeds a maximum time out value, wherein the amount of time is the time that has elapsed since the message was transmitted to the destination machine without at least one of receiving a response and completing a task. In accordance with another example aspect of the present disclosure, which may be used in combination with any one or more of the preceding aspects, the request from the source virtual machine is a request to disable access to the block of memory. In accordance with another example aspect of the present disclosure, which may be used in combination with any one or more of the preceding aspects, the request from the source virtual machine is a request to reset the source virtual machine.

In a third example aspect of the present disclosure, a computer-readable non-transitory storage medium comprises executable instructions that, receive, by a hypervisor executing on a computer system, a message from a source virtual machine to be transmitted to a destination machine, reserve, by the hypervisor, a block of memory associated with the message, transmit the message received from the source virtual machine to the destination machine, determine, by the hypervisor, whether to reclaim the block of memory, responsive to a determination to reclaim the block of memory, offline, by the hypervisor, the block of memory by at least one of offlining one or more pages corresponding to the block of memory and offlining all memory corresponding to the source virtual machine, and indicate, by the hypervisor, to the source virtual machine that the block of memory is accessible. In accordance with another example aspect of the present disclosure, which may be used in combination with the any one or more of the preceding aspects, reserving the block of memory includes pinning the block of memory. In accordance with another example aspect of the present disclosure, which may be used in combination with any one or more of the preceding aspects, the determination to reclaim the block of memory occurs upon determining, by the hypervisor, that an amount of time exceeds a maximum time out value, wherein the amount of time is the time that has elapsed since the message was transmitted to the destination machine without at least one of receiving a response and completing a task. In accordance with another example aspect of the present disclosure, which may be used in combination with any one or more of the preceding aspects, the maximum time out value is provided to the hypervisor by the source virtual machine. In accordance with another example aspect of the present disclosure, which may be used in combination with any one or more of the preceding aspects, the determination, by the hypervisor, to reclaim the block of memory occurs upon receiving a request from the source virtual machine to reclaim the block of memory. In accordance with another example aspect of the present disclosure, which may be used in combination with any one or more of the preceding aspects, the request from the source virtual machine is transmitted upon determining that an amount of time exceeds a maximum time out value, wherein the amount of time is the time that has elapsed since the message was transmitted to the destination machine without at least one of receiving a response and completing a task. In accordance with another example aspect of the present disclosure, which may be used in combination with any one or more of the preceding aspects, the request from the source virtual machine is a request to disable access to the block of memory. In accordance with another example aspect of the present disclosure, which may be used in combination with any one or more of the preceding aspects, the request from the source virtual machine is a request to reset the source virtual machine.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
one or more processors, in communication with the memory;
one or more virtual machines executing on the one or more processors; and
a hypervisor executing on the one or more processors to:
  receive, by the hypervisor, a message from a source virtual machine to be transmitted to a destination machine;
  reserve, by the hypervisor, a first block of memory associated with the message;
  transmit the message received from the source virtual machine to the destination machine with a zero copy operation;
  after the message is transmitted to the destination machine, determine, by the hypervisor, whether to reclaim the first block of memory, a determination to reclaim the first block of memory being made by the hypervisor responsive to an amount of time exceeding a maximum time out value having elapsed since the message was transmitted without at least one of receiving a response and completing a task having occurred;
  responsive to the determination to reclaim the first block of memory and in response to receiving a request to reset the source virtual machine, offlining, by the hypervisor, one or more pages corresponding to the first block of memory; and
  indicate, by the hypervisor, to the source virtual machine that the first block of memory is accessible.

2. The system of claim 1, wherein reserving the first block of memory includes pinning the first block of memory.

3. The system of claim 1, wherein the maximum time out value is provided to the hypervisor by the source virtual machine.

4. The system of claim 1, wherein the hypervisor, reclaims the first block of memory upon receiving a request from the source virtual machine to reclaim the first block of memory.

5. The system of claim 4, wherein the request from the source virtual machine is transmitted upon determining that an amount of time exceeds a maximum time out value, wherein the amount of time is the time that has elapsed since the message was transmitted to the destination machine without at least one of receiving a response and completing a task.

6. The system of claim 4, wherein the request from the source virtual machine is a request to disable access to the first block of memory.

7. The system of claim 1, wherein prior to offlining the first block of memory, copying, by the hypervisor, the message to a second block of memory.

8. The system of claim 1, wherein the hypervisor offlines all memory corresponding to the source virtual machine.

9. The system of claim 8, wherein the source virtual machine transmits the request to reset the source virtual machine to the hypervisor and the hypervisor offlines all memory corresponding to the source virtual machine responsive to the request to reset the source virtual machine.

10. A method, comprising:
receiving, by a hypervisor executing on a computer system, a message from a source virtual machine to be transmitted to a destination machine;
reserving, by the hypervisor, a first block of memory associated with the message;
transmitting the message received from the source virtual machine to the destination machine with a zero copy operation;
after the message is transmitted to the destination machine, determining, by the hypervisor, whether to reclaim the first block of memory, a determination to reclaim the memory being made by the hypervisor responsive to an amount of time exceeding a maximum time out value having elapsed since the message was transmitted without at least one of receiving a response and completing a task having occurred;
responsive to the determination to reclaim the first block of memory and in response to receiving a request to reset the source virtual machine, offlining, by the hypervisor, one or more pages corresponding to the first block of memory; and
indicating, by the hypervisor, to the source virtual machine that the first block of memory is accessible.

11. The method of claim 10, wherein reserving the first block of memory includes pinning the first block of memory.

12. The method of claim 10, wherein the maximum time out value is provided to the hypervisor by the source virtual machine.

13. The method of claim 10, wherein the first block of memory is reclaimed upon receiving a request from the source virtual machine to reclaim the first block of memory.

14. The method of claim 13, wherein the request from the source virtual machine is transmitted upon determining that an amount of time exceeds a maximum time out value, wherein the amount of time is the time that has elapsed since the message was transmitted to the destination machine without at least one of receiving a response and completing a task.

15. The method of claim 10, wherein prior to offlining the first block of memory, copying, by the hypervisor, the message to a second block of memory.

16. A computer-readable non-transitory storage medium comprising executable instructions that, when executed by a computer system, cause the computer system to:
receive, by a hypervisor executing on a computer system, a message from a source virtual machine to be transmitted to a destination machine;
reserve, by the hypervisor, a first block of memory associated with the message;
transmit the message received from the source virtual machine to the destination machine with a zero copy operation;
after the message is transmitted to the destination machine, determine, by the hypervisor, whether to reclaim the first block of memory, a determination to reclaim the first block of memory being made by the hypervisor responsive to an amount of time exceeding a maximum time out value having elapsed since the message was transmitted without at least one of receiving a response and completing a task having occurred;
responsive to the determination to reclaim the first block of memory and in response to receiving a request to reset the source virtual machine, offlining, by the hypervisor, one or more pages corresponding to the first block of memory; and
indicate, by the hypervisor, to the source virtual machine that the first block of memory is accessible.

17. The computer-readable non-transitory storage medium of claim 16, wherein reserving the first block of memory includes pinning the first block of memory.

18. The computer-readable non-transitory storage medium of claim 16, wherein the maximum time out value is provided to the hypervisor by the source virtual machine.

19. The computer-readable non-transitory storage medium of claim 16, wherein the first block of memory is reclaimed upon receiving a request from the source virtual machine to reclaim the first block of memory.

20. The computer-readable non-transitory storage medium of claim 19, wherein the request from the source virtual machine is transmitted upon determining that an amount of time exceeds a maximum time out value, wherein the amount of time is the time that has elapsed since the message was transmitted to the destination machine without at least one of receiving a response and completing a task.

* * * * *